United States Patent
Miyagawa et al.

(10) Patent No.: US 9,896,088 B2
(45) Date of Patent: Feb. 20, 2018

(54) DRIVE CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Takeshi Miyagawa, Toyokawa (JP); Atsushi Tabata, Okazaki (JP); Tatsuya Imamura, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/374,387

(22) Filed: Dec. 9, 2016

(65) Prior Publication Data

US 2017/0166200 A1 Jun. 15, 2017

(30) Foreign Application Priority Data

Dec. 11, 2015 (JP) .................... 2015-241855

(51) Int. Cl.

| | |
|---|---|
| *F16H 48/06* | (2006.01) |
| *B60W 20/00* | (2016.01) |
| *B60K 6/365* | (2007.10) |
| *B60W 20/40* | (2016.01) |
| *B60K 6/442* | (2007.10) |
| *B60W 10/02* | (2006.01) |

(Continued)

(52) U.S. Cl.
CPC .......... *B60W 20/40* (2013.01); *B60K 6/387* (2013.01); *B60K 6/442* (2013.01); *B60K 6/445* (2013.01); *B60W 10/02* (2013.01); *B60W 10/06* (2013.01); *B60W 10/08* (2013.01); *B60W 20/20* (2013.01); *B60K 6/365* (2013.01); *B60K 2006/381* (2013.01); *B60W 20/00* (2013.01); *B60W 2710/021* (2013.01); *B60W 2710/083* (2013.01); *B60Y 2200/92* (2013.01); *Y10S 903/93* (2013.01); *Y10S 903/946* (2013.01)

(58) Field of Classification Search
CPC ...... B60W 20/40; B60W 10/02; B60W 10/06; B60W 10/08; B60W 2710/021; B60W 2710/083; B60Y 2200/92; Y10S 903/93; Y10S 903/946
See application file for complete search history.

(56) References Cited

U.S. PATENT DOCUMENTS

| | | | |
|---|---|---|---|
| 2015/0211620 A1* | 7/2015 | Matsubara | B60K 6/387 475/5 |
| 2016/0347307 A1* | 12/2016 | Banshoya | B60W 10/12 |
| 2017/0113679 A1* | 4/2017 | Hata | B60K 6/387 |

FOREIGN PATENT DOCUMENTS

| | | |
|---|---|---|
| JP | 2011-063136 A | 3/2011 |
| JP | 2012-071699 A | 4/2012 |
| JP | 2015-024762 A | 2/2015 |

\* cited by examiner

*Primary Examiner* — Ramya Burgess
*Assistant Examiner* — Lillian Nguyen
(74) *Attorney, Agent, or Firm* — Andrews Kurth Kenyon LLP

(57) ABSTRACT

A drive control system for a hybrid vehicle is provided to shift an operating mode smoothly to an electric vehicle mode in which an engine is stopped. A controller is configured to select the electric vehicle mode to be established from the first electric vehicle mode and the second electric vehicle mode upon satisfaction of the determination to shift the operating mode to the electric vehicle mode, to select the clutch to be engaged from the first clutch and the second clutch to establish the selected electric vehicle mode, and to stop the engine while engaging the selected clutch.

6 Claims, 10 Drawing Sheets

(51) Int. Cl.
*B60W 10/06* (2006.01)
*B60W 10/08* (2006.01)
*B60K 6/387* (2007.10)
*B60K 6/445* (2007.10)
*B60W 20/20* (2016.01)
*B60K 6/38* (2007.10)

Fig. 4

|  |  |  |  | B0 | C0 | CS |
|---|---|---|---|---|---|---|
| EV Mode | Forward/Reverse | Single-Motor Mode | MG1 Connected |  |  | (O) |
|  |  |  | MG1 Disconnected |  | O |  |
|  |  | Dual-Motor Mode |  | O | O |  |
| HV Mode | Series | Forward/Reverse |  |  |  | O |
|  | Series Parallel | Forward | Variable |  | O |  |
|  |  |  | Fixed(Dual-Motor) |  | O | O |
|  |  | Reverse |  |  | O |  |

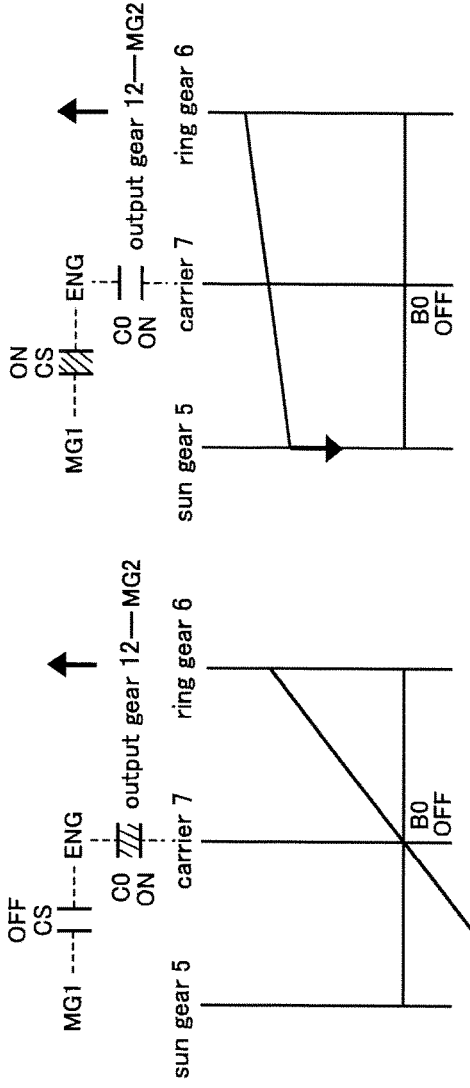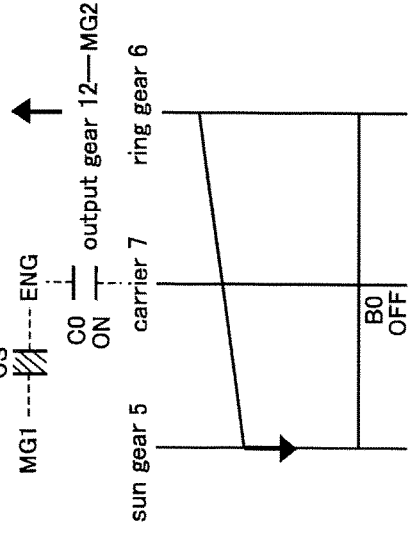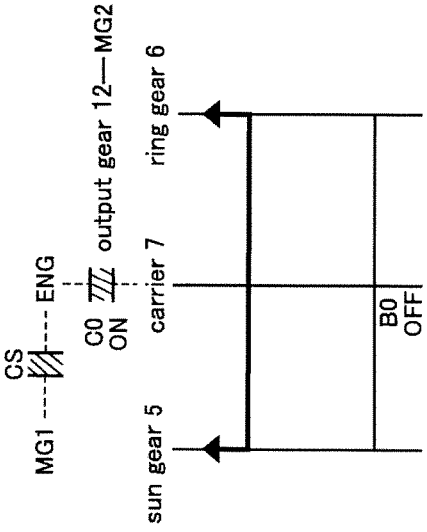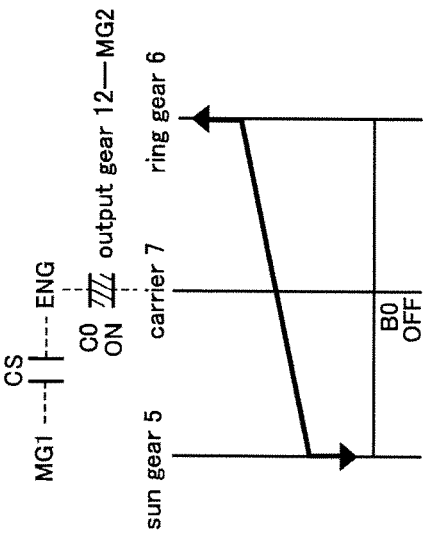

DRIVE CONTROL SYSTEM FOR HYBRID VEHICLE

CROSS REFERENCE TO RELATED APPLICATIONS

The present application claims the benefit of priority to Japanese Patent Application No. 2015-241855 filed on Dec. 11, 2015 with the Japanese Patent Office, the entire contents of which are incorporated herein by reference in its entirety.

BACKGROUND

Field of the Disclosure

Embodiments of the present application relates to the art of a drive control system for a hybrid vehicle having an engine, two motors and a power distribution device, in which an operating mode is switched by manipulating clutches to change a power transmission route.

Discussion of the Related Art

JP-A-2012-071699 describes one example of a hybrid vehicle comprising: a power distribution device having an input element connected to an engine, a reaction element connected to a first motor, and an output element connected to drive wheels; and a second motor applying a torque to an output side of the power distribution device. JP-A-2011-063136 also describes a hybrid vehicle of this kind. According to the teachings of JP-A-2012-071699 and JP-A-2011-063136, an operating mode of the hybrid vehicle can be selected from: a series parallel mode, in which power generated by an engine is partially converted into an electric power by the first motor while delivering the remaining power to drive wheels, and a the motor is driven by the electric power generated by the first motor to generate driving force; a series mode in which an output power of the engine is converted into an electric power by the first motor to drive the second motor by the generated electric power; and an electric vehicle mode in which the vehicle is powered by the second motor while stopping the engine. The operating mode is switched by manipulating a plurality of clutches.

The hybrid vehicle taught by JP-A-2012-071699 is provided with a first clutch that selectively provide a connection between the engine and the power distribution device, and a second clutch that selectively provide a connection between the engine and the first motor. According to the teachings of JP-A-2012-071699, specifically, the series parallel mode is established by engaging the first clutch while disengaging the second clutch, and the electric vehicle mode is established by disengaging the first clutch while engaging the second clutch. A control system taught by JP-A-2012-071699 is configured to stop the engine promptly when shifting from the series parallel mode to the electric vehicle mode by delivering output torque of the first motor to the engine while engaging the second clutch to connect the engine to the first motor In the electric vehicle mode, it is preferable to further select the operating mode from a mode in which the first motor is rotated passively and a mode in which a rotation of the first motor is halted depending on a state of charge of a battery. However, in the hybrid vehicles taught by JP-A-2012-071699 and JP-A-2011-063136, the operating mode cannot be further selected in the electric vehicle mode.

In order to establish the above-mentioned modes of the electric vehicle mode, it is necessary to manipulate a plurality of clutches (including a brake) to alter the power transmission route. However, if only a specific clutch is engaged to switch the operating mode from the mode in which the vehicle is powered by the engine to the electric vehicle mode, a complicated control is required and an engagement shock of the clutch may be caused. Specifically, the above-mentioned modes of the electric vehicle mode are selected on the basis of a required driving force, a vehicle speed, a state of charge of the battery etc. To this end, a specific control to select the operating mode of the EV mode is required, and the clutches have to be engaged and disengaged consecutively to shift the operating mode without delay.

SUMMARY

The Aspects of the present disclosure have been conceived noting the foregoing technical problems, and it is therefore an object of the present application is to provide a drive control system for a hybrid vehicle configured to shift an operating mode smoothly to an electric vehicle mode in which the engine is stopped, and to propel the vehicle smoothly in the electric vehicle mode.

The drive control system according to the preferred embodiment of the present application is applied to a hybrid vehicle comprising: an engine; a first motor having a generating function; a power distribution device that performs a differential action among an input element to which a torque of the engine is applied, a reaction element to which a torque of the first motor is applied, and an output element; a first clutch that is engaged to transmit the torque of the engine to drive wheels through the power distribution device; a second clutch that selectively provide a connection between an output shaft of the engine and the first motor; and a second motor that generates a drive torque for propelling the vehicle. An operating mode can be selected from: a series parallel mode in which at least the first clutch is engaged, and the vehicle is powered by the engine and the second motor; a series mode in which the first clutch is disengaged and the second clutch is engaged, the first motor is rotated by the engine to generate electric power, and the second motor is operated by the electric power generate by the first motor to propel the vehicle; and an electric vehicle mode including a first electric vehicle mode in which the vehicle is powered at least by the second motor while stopping the engine and engaging the first clutch, and a second electric vehicle mode in which the vehicle is powered by the second motor while stopping the engine and disengaging the first clutch. In order to achieve the above-mentioned objectives, according to the embodiment, the drive control system is provided with a controller that manipulates the clutches and stops the engine. Specifically, the controller is configured: to determine to shift the operating mode to the electric vehicle mode while stopping the engine; to select the operating mode from the first electric vehicle mode and the second electric vehicle mode to be established upon satisfaction of the determination to shift the operating mode to the electric vehicle mode; to select the clutch to be engaged when stopping the engine from the first clutch and the second clutch to establish the selected electric vehicle mode; and to stop the engine while engaging the selected clutch.

In a non-limiting embodiment, the controller may be further configured to stop the engine while keeping the first clutch in engagement and disengaging the second clutch in a case of shifting the operating mode from the series parallel mode or the series mode to the first electric vehicle mode.

In a non-limiting embodiment, the series parallel mode may include a first series parallel mode that is established by engaging the first clutch while disengaging the second clutch, and a second series parallel mode that is established by engaging both of the first clutch and the second clutch. In addition, the controller may be further configured to stop the engine while disengaging the first clutch and keeping the second clutch in engagement in a case of shifting the operating mode from the second series parallel mode to the second electric vehicle mode.

In a non-limiting embodiment, the controller may be further configured to stop the engine while keeping the first clutch in engagement and the second clutch in disengagement, in a case of shifting the operating mode from the first series parallel mode to the second electric vehicle mode.

In a non-limiting embodiment, the controller may be further configured to stop the engine while keeping the first clutch in disengagement and the second clutch in engagement, in a case of shifting the operating mode from the series mode to the second electric vehicle mode In a non-limiting embodiment, the controller may be further configured to stop the engine while applying a torque of the first motor to the engine.

Thus, in the hybrid vehicle to which the drive control system according to the embodiment is applied, a hybrid mode in which the vehicle is powered at least by the engine can be selected from the series parallel mode and the series mode. In addition, the electric vehicle mode in which the engine is stopped can be selected from the first electric vehicle mode in which the vehicle is powered at least by the second motor while engaging the first clutch, and the second electric vehicle mode in which the vehicle is powered by the second motor while disengaging the first clutch. As described, the controller is configured to select the clutch to be engaged when shifting the operating mode from the hybrid mode to the electric vehicle mode, and to stop the engine while engaging the selected clutch. According to the embodiment of the present application, therefore, the vehicle is allowed to propel in the desired electric vehicle mode after stopping the engine. In addition, the second clutch may also be disengaged after stopping the engine in the case of shifting to the second electric vehicle mode. For these reasons, the operating mode may be shifted smoothly and promptly to the electric vehicle mode after stopping the engine. In addition, engagement shocks of the clutch may be reduced.

Further, when shifting the operating mode from the hybrid mode to the electric vehicle mode, the torque of the first motor used to stop the engine will not be delivered to the drive wheels by disengaging the first clutch while engaging the second clutch. According to the embodiment, therefore, a shock resulting from stopping the engine can be reduced.

BRIEF DESCRIPTION OF THE DRAWINGS

Features, aspects, and advantages of exemplary embodiments of the present disclosure will become better understood with reference to the following description and accompanying drawings, which should not limit the invention in any way.

FIG. 4 is a table showing engagement states of the clutches and the brake in each operating mode;

FIGS. 5a, 5b, 5c and 5d show nomographic diagrams individually indicating status of the power distribution device in each operating mode of the vehicle shown in FIG. 2;

DETAILED DESCRIPTION OF THE PREFERRED EMBODIMENT(S)

Figure 2:
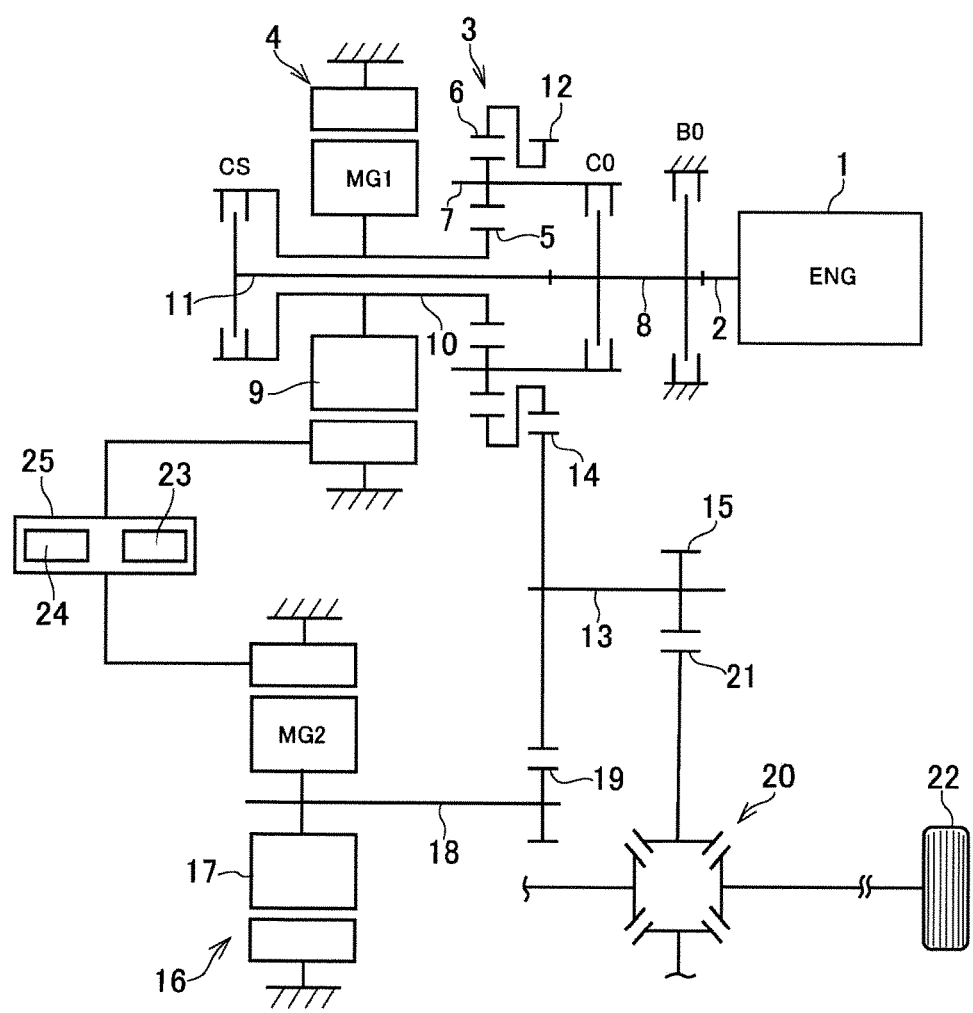
FIG. 2 is a schematic illustration showing one example of the vehicle to which the control system according to the embodiment is applied.

Preferred embodiments of the present application will now be explained with reference to the accompanying drawings. Referring now to FIG. 2, there is shown one example of the hybrid vehicle to which the control system according to the present application is applied. The vehicle shown in FIG. 2 is provided with two motors and an internal combustion engine (as will be simply called the "engine" hereinafter) to power the vehicle. For example, a permanent magnet synchronous motor having a generating function may be used as the motor, and a gasoline engine or a diesel engine may be used as the engine.

In the vehicle shown in FIG. 2, a power distribution device 3 and a first motor (referred to as "MG1" in FIG. 1) 4 are arranged coaxially with an output shaft (i.e., a crankshaft) 2 of an engine (referred to as "ENG" in FIG. 2) 1. Specifically, the power distribution device 3 is a single-pinion planetary gear unit adapted to perform a differential action comprising a sun gear 5 as a reaction element, a ring gear 6 as an output element arranged concentrically with the sun gear 5, and a carrier 7 as an input element supporting planetary gears interposed between the sun gear 5 and the ring gear 6 in a rotatable manner.

An input shaft 8 extending along a rotational center axis of the power distribution device 3 is connected to the output shaft 2, and an input clutch C0 as a first clutch is arranged to selectively connect the input shaft 8 to the carrier 7. For example, a wet-type friction clutch may be used as the input clutch C0, and the input clutch C0 is hydraulically engaged to connect the input shaft 8 to the carrier 7. A rotation of the output shaft 2 connected to the input shaft 8 is selectively halted by a brake B0. A wet-type friction clutch may also be used as the brake B0, and the brake B0 is hydraulically engaged to halt a rotation of the output shaft 2 connected to the input shaft 8.

Thus, the first motor 4 is disposed on an opposite side of the engine 1 across the power distribution device 3, and a first rotor shaft 10 as a hollow shaft integral with a first rotor 9 of the first motor 4 is connected to the sun gear 5. An intermediate shaft 11 penetrating through the first rotor shaft 10 while being allowed to rotate relatively with respect to the first rotor shaft 10 is connected to the input shaft 8 to be rotated integrally therewith. The intermediate shaft 11 is selectively connected to the first rotor shaft 10 by a series clutch CS as a second clutch. A wet-type friction clutch may also be used as the series clutch CS, and the series clutch CS is engaged hydraulically to connect the intermediate shaft 11 to the first rotor shaft 10.

The ring gear 6 of the power distribution device 3 is connected to an output gear 12 to be rotated integrally therewith, and hence the output torque of the engine 1 is delivered to the output gear 12 through the power distribution device 3 by engaging the input clutch C0 while establishing a reaction torque by the first motor 4. Thus, such torque transmission from the engine 1 to the output gear 12 through the power distribution device 3 is selectively achieved by manipulating the input clutch C0.

A countershaft 13 extends parallel to the output shaft 2 of the engine 1, the input shaft 8 and the intermediate shaft 11. A driven gear 14 is fitted onto one end of the countershaft 13 to be meshed with the output gear 12, and a drive gear 15 is fitted onto the other end of the countershaft 13.

A second motor (referred to as "MG2" in FIG. 2) 16 is disposed parallel to the countershaft 13. A drive gear 19 is fitted onto a second rotor shaft 18 integral with a second rotor 17 of the second motor 16 to be meshed with the driven gear 14. The second motor 16 serves as a motor by supplying an electric power thereto, and an output torque of the second motor 16 is added to a torque delivered from the output gear 12.

A differential gear unit 20 as a final reduction is disposed parallel to the countershaft 13 and the second motor 16, and a ring gear 21 of the differential gear unit 20 is meshed with the drive gear 15 disposed on the countershaft 13. A pair of drive wheels 22 is connected to the differential gear unit 20 through output shafts of the differential gear unit 20.

The first motor 4 and the second motor 16 are electrically connected with a power source 25 including a storage device 23 such as a battery and a capacitor, and an inverter 24. The first motor 4 and the second motor 16 are selectively operated as a motor and a generator by controlling a current supply from the power source 25, and the second motor 16 can be operated as a motor by an electric power generated by the first motor 4.

An operating mode of the vehicle according to the embodiment can be selected from an electric vehicle mode (abbreviated as the "EV mode" hereinafter) and a hybrid mode (abbreviated as the "HV mode" hereinafter), and the HV mode can be selected from a series mode and a series parallel mode. In order to electrically control the vehicle and to switch the operating mode, the vehicle is provided with a hybrid control unit (as will be called the "HV-ECU" hereinafter) 100 as a controller.

Figure 3:
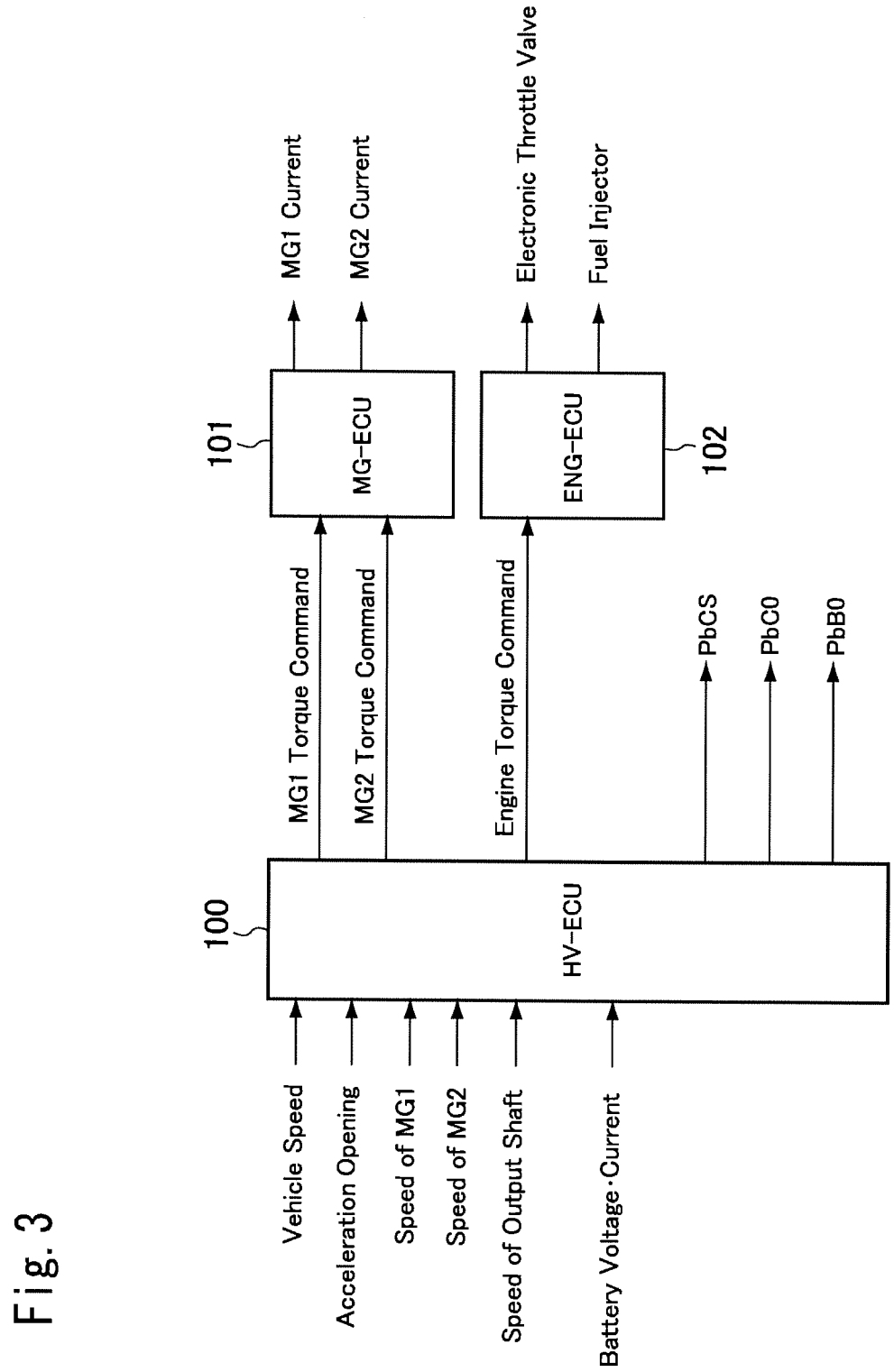
FIG. 3 is a block diagram schematically showing the control system.

Turning to FIG. 3, there is shown a control system of the vehicle according to the preferred embodiment in more detail. The HV-ECU 100 is composed mainly of a microcomputer configured to carry out a calculation based on incident data, stored data and stored programs, and transmit a calculation result in the form of command signal. To this end, the HV-ECU 100 receives detection signals about a vehicle speed, an opening degree of an accelerator (or a required driving force), a speed of the first motor 4 (referred to as "MG1 speed" in FIG. 3), a speed of the second motor 16 (referred to as "MG2 speed" in FIG. 3), a speed of an output shaft (i.e., a speed of the output gear 12 or the countershaft 13), a voltage and a current of the storage device 23 and so on. Torque commands to the first motor 4 and the second motor 16 calculated by the HV-ECU 100 are sent to an after-mentioned motor control unit (as will be called the "MG-ECU" hereinafter) 101 that is also an electronic control unit, and a torque command to the engine 1 calculated by the HV-ECU 100 is sent to an after-mentioned engine control unit (as will be called the "EG-ECU" hereinafter) 102 that is also an electronic control unit. Hydraulic pressures applied to the series clutch CS, the input clutch C0 and the brake B0 are controlled based on hydraulic commands PbCS, PbC0, and PbB0 calculated by the HV-ECU 100.

Specifically, the hydraulic pressures applied to the series clutch CS, the input clutch C0 and the brake B0 are controlled by controlling supply current to not shown solenoid valves for controlling the oil delivered to those engagement devices based on hydraulic commands PbCS, PbC0, and PbB0.

The MG-ECU 101 and the EG-ECU 102 are also configured to carry out a calculation based on incident data, stored data and stored programs, and to transmit a calculation result in the form of command signal. Specifically, the MG-ECU 101 is configured to calculate supply currents to the first motor 4 and the second motor 16 based on the torque commands transmitted from the HV-ECU 100, and to transmit current command signals to the first motor 4 and the second motor 16. The EG-ECU 102 is configured to calculate a target torque of the engine 1, and to transmit command signals to control an opening degree of the throttle valve (not shown) and a fuel injection to the engine 1.

Engagement states of the clutches C0 and CS and the brake B0 in each operating mode are shown in FIG. 4. In FIG. 4, "O" represents an engagement of the engagement device. In the EV mode, the vehicle is propelled by an electric power of the storage device 23, and the EV mode can be selected from a single-motor mode in which the vehicle is powered by the second motor 16, and a dual-motor mode in which the vehicle is powered by both of the first motor 4 and the second motor 16. Further, the single-motor mode can be selected from a disconnecting mode in which the first motor 4 is disconnected completely from the powertrain in order not to be rotated, and a connecting mode in which the first motor 4 is connected to the second motor 16 and drive wheels 22 to be rotated passively. In the disconnecting mode, specifically, at least the input clutch C0 and the brake B0 are disengaged and the series clutch CS is engaged according to need, while activating the second motor 16 by the electric power from the storage device 23 so that an output torque of the second motor 16 is delivered to the differential unit 20 through the countershaft 13. In this situation, although the output gear 12 is rotated by a rotation of the driven gear 14, the input clutch C0 is thus disengaged to allow the carrier 7 to rotate freely and hence the engine 1 and the first motor 4 are prevented from being rotated.

By contrast, in the connecting mode, only the input clutch C0 is engaged while activating the second motor 16 by the electric power from the storage device 23. In this situation, the carrier 7 is connected to the input shaft 8 to be prevented from being rotated so that the sun gear 5 is rotated in the opposite direction (i.e., in the counter direction) together with the first rotor shaft 10 and the first rotor 9 connected thereto. Such status of the power distribution device 3 in the connecting mode is indicated in a nomographic diagram shown in FIGS. 5a, 5b, 5c and 5d. In FIGS. 5a, 5b, 5c and 5d, "ON" and "OFF" individually represents an engagement and a disengagement of the engagement element, and the arrow indicates a direction of the torque.

The dual-motor mode is established by engaging the input clutch C0 and the brake B0. In the dual-motor mode, both of the first motor 4 and the second motor 16 are activated by the electric power supplied from the storage device 23 to propel the vehicle. In this case, the carrier 7 of the power distribution device 3 is halted and hence ring gear 6 and the output gear 12 are rotated in the forward direction to propel the vehicle in the forward direction by rotating the first motor 4 in the counter direction. Consequently, an output torque of the first motor 4 is delivered from the output gear 12 to the differential gear unit 20 through the countershaft 13. In this situation, if the second motor 16 is rotated in the forward direction, an output torque thereof is added to the torque delivered from the output gear 12 at the countershaft 13 so that a total torque of the first motor 4 and the second motor 16 is delivered to the differential gear unit 20. Accordingly, the connecting mode and the dual-motor mode correspond to the "first electric vehicle mode", and the disconnecting mode corresponds to the "second electric vehicle mode".

In the HV mode, the series mode is established by engaging only the series clutch CS. FIG. 5b shows an operating state of the power distribution device 3 under the situation in which the vehicle is propelled in the forward direction in the series mode. In the series mode, an output torque of the engine 1 is delivered to the first motor 4 through the series clutch CS so that the first motor 4 is operated as a generator. In this case, the carrier 7 of the power distribution device 3 is allowed to rotate freely and hence an output torque of the engine 1 is not delivered to the output gear 12. An electric power generated by the first motor 4 is supplied to the second motor 16 to operate the second motor 16 as a motor, and an output torque of the second motor 16 is delivered to the differential gear unit 20 through the countershaft 13 to propel the vehicle. In this situation, as indicated in FIG. 5b, the ring gear 6 is rotated in the forward direction in accordance with the vehicle speed, and the sun gear 5 is rotated at a same speed as the engine 1. Consequently, the carrier 7 is idled at a speed governed by rotational speeds of the ring gear 6 and the sun gear 5 and a gear ratio of the power distribution device 3 (i.e., a ratio between teeth number of the sun gear 5 and teeth number of the ring gear 6).

In the series parallel mode, the vehicle is powered by the engine 1, the first motor 4 and the second motor 16. If the vehicle is propelled in the forward direction, the series parallel mode may be switched between a variable mode in which a ratio of an engine speed to an output shaft speed (e.g., speed of the output gear 12) can be varied continuously, and a fixed mode in which the power distribution device 3 is rotated integrally.

Specifically, during forward propulsion in the series parallel mode, the variable mode is established by engaging only the input clutch C0. FIG. 5c shows an operating state of the power distribution device 3 in the variable mode. In this case, an output torque of the engine 1 is delivered to the carrier 7 of the power distribution device 3 through the input clutch C0 so that the carrier 7 is rotated in the forward direction. In this situation, the first motor 4 is operated as a generator and hence a negative torque is applied to the sun gear 5. Consequently, the ring gear 6 and the output gear 12 integral therewith are rotated in the forward direction. An electric power generated by the first motor 4 is supplied to the second motor 16 to operate the second motor 16 as a motor, and an output torque of the second motor 16 is added to the torque delivered from the output gear 12 at the countershaft 13. Thus, in the variable mode, power of the engine 1 is partially delivered from the output gear 12 to the differential gear unit 20 through the power distribution device 3, and the remaining power of the engine 1 is once converted into an electric power to activate the second motor 16 and then converted into a drive torque by the second motor 16 to be delivered to the differential gear unit 20. In the variable mode, a speed of the engine 1 can be controlled in an optimally fuel efficient manner by controlling a speed of the first motor 4.

During forward propulsion in the series parallel mode, the fixed mode is established by engaging the input clutch C0 and the series clutch CS. FIG. 5d shows an operating state of the power distribution device 3 in the fixed mode. In this case, since the input clutch C0 and the series clutch CS are engaged, the carrier 7 is connected to the sun gear 5 so that the power distribution device 3 is rotated integrally. Consequently, an output torque of the engine 1 is delivered to the output gear 12 without being amplified or reduced. In this situation, the first motor 4 is connected to the engine 1 through the power distribution device 3, and hence an output torque of the first motor 4 driven as a motor by the electric power supplied from the storage device 23 can be added to the output torque of the engine 1. Likewise, an output torque of the second motor 16 driven as a motor by the electric power supplied from the storage device 23 may also be added to the output torque of the engine 1.

Figure 6:
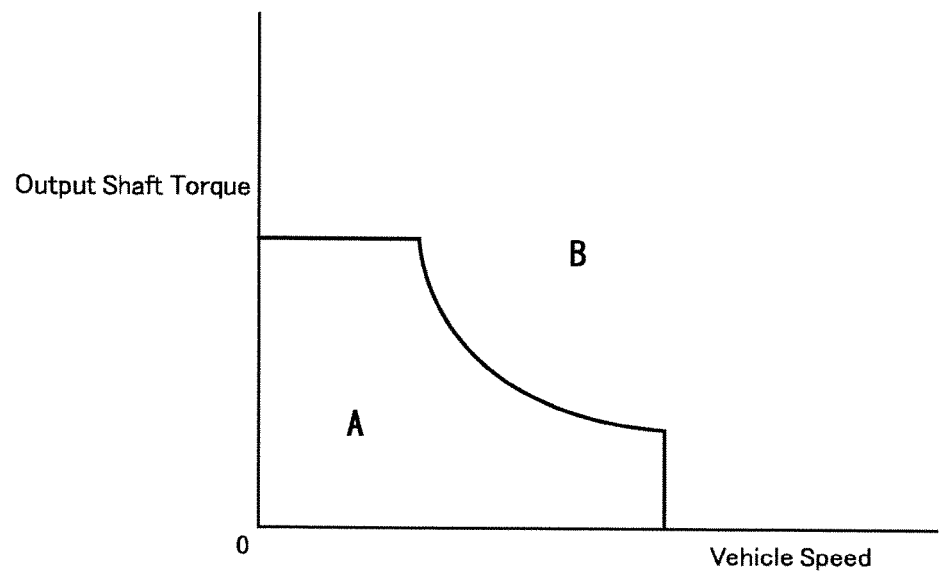
FIG. 6 is a map for shifting the operating mode between the dual-motor mode and the series parallel mode based on an output shaft torque and a vehicle speed that is used when an SOC level of a battery is relatively high.

In principle, the dual-motor mode is selected when a state of charge (abbreviated as the "SOC" hereinafter) of the storage device 23 is higher than a predetermined level, and the series parallel mode is selected when a power higher than a total power of the first motor 4 and the second motor 16 is required. Turning to FIG. 6, there is shown one example of a map used to shift the operating mode when the SOC level of the storage device 23 is higher than the predetermined level. The map shown in FIG. 6 is installed in the HV-ECU 100, and in FIG. 6, the vertical axis represents an output shaft torque (i.e., a required torque) and the horizontal axis represents a vehicle speed. Specifically, the dual-motor mode is established when an operating point determined by the output shaft torque and the vehicle speed falls within a first region A. In this case, the first motor 4 and the second motor 16 are controlled in such a manner as to achieve a required power in a power-efficient manner. If the operating point falls within a second region B, this means that the required power cannot be achieved by the first motor 4 and the second motor 16 and hence the series parallel mode is established. In this case, the variable mode and the fixed mode may be selected according to need. For example, the variable mode may be selected if a switch for setting as economy mode is pressed.

Figure 7:
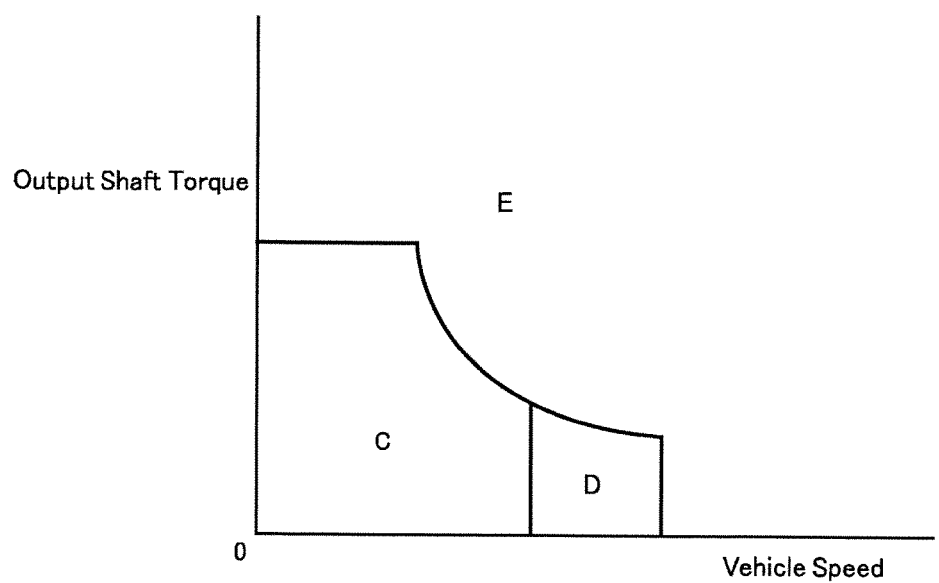
FIG. 7 is a map for shifting the operating mode between the single-motor mode and the series parallel mode based on an output shaft torque and a vehicle speed that is used when an SOC level of a battery is relatively low.

When the SOC level of the storage device 23 is lower than the predetermined level, the operating mode is selected using a map shown in FIG. 7. The map shown in FIG. 7 is also installed in the HV-ECU 100, and in FIG. 7, the vertical axis also represents the output shaft torque (i.e., the required torque) and the horizontal axis also represents the vehicle speed. Specifically, when the output shaft torque is small and the vehicle speed is low so that the operating point falls within a third region C, the single-motor mode is selected in principle. In this case, the disconnecting mode is selected in most cases. However, given that the lubricant is required to be warmed or that the engine 1 is expected to be started, the connecting mode may also be selected. When the output shaft torque is relatively small but the vehicle speed is in a mid-speed range so that the operating point falls within a fourth region D, the series mode is selected. If the operating point falls within a fifth region E, this means that the required power cannot be achieved by the second motor 16 and hence the series parallel mode is established.

If the SOC level of the storage device 23 is lower than another predetermined level that is lower than the above-mentioned level, the vehicle cannot be powered only by the first motor 4 and the second motor 16 and hence it is necessary to ensure the electric power to start the engine 1. In this case, therefore, the series mode or the series parallel mode is selected even if the operating point falls within the third region C.

For example, when the operating point is moved from the second region B to the first region A, when operating point is moved from the fourth region D or the fifth region E to the third region C, or when the SOC level of the storage device 23 exceeds the predetermined level, the operating mode is shifted from the series parallel mode or the series mode to the EV mode and hence the engine 1 is stopped. However, the engine 1 may not be stopped immediately by merely stopping fuel supply thereto. In this situation, therefore, any one of the input clutch C0 and the series clutch CS is engaged to apply a counter torque of the first motor 4 to the engine 1 so as to shorten the amount of time in which revolution of the engine per unit of time is consistent with natural frequencies of the engine 1 and the power distribution device 3. Thus, according to the embodiment, the engine 1 is stopped by applying the torque of the first motor 4.

Figure 1:
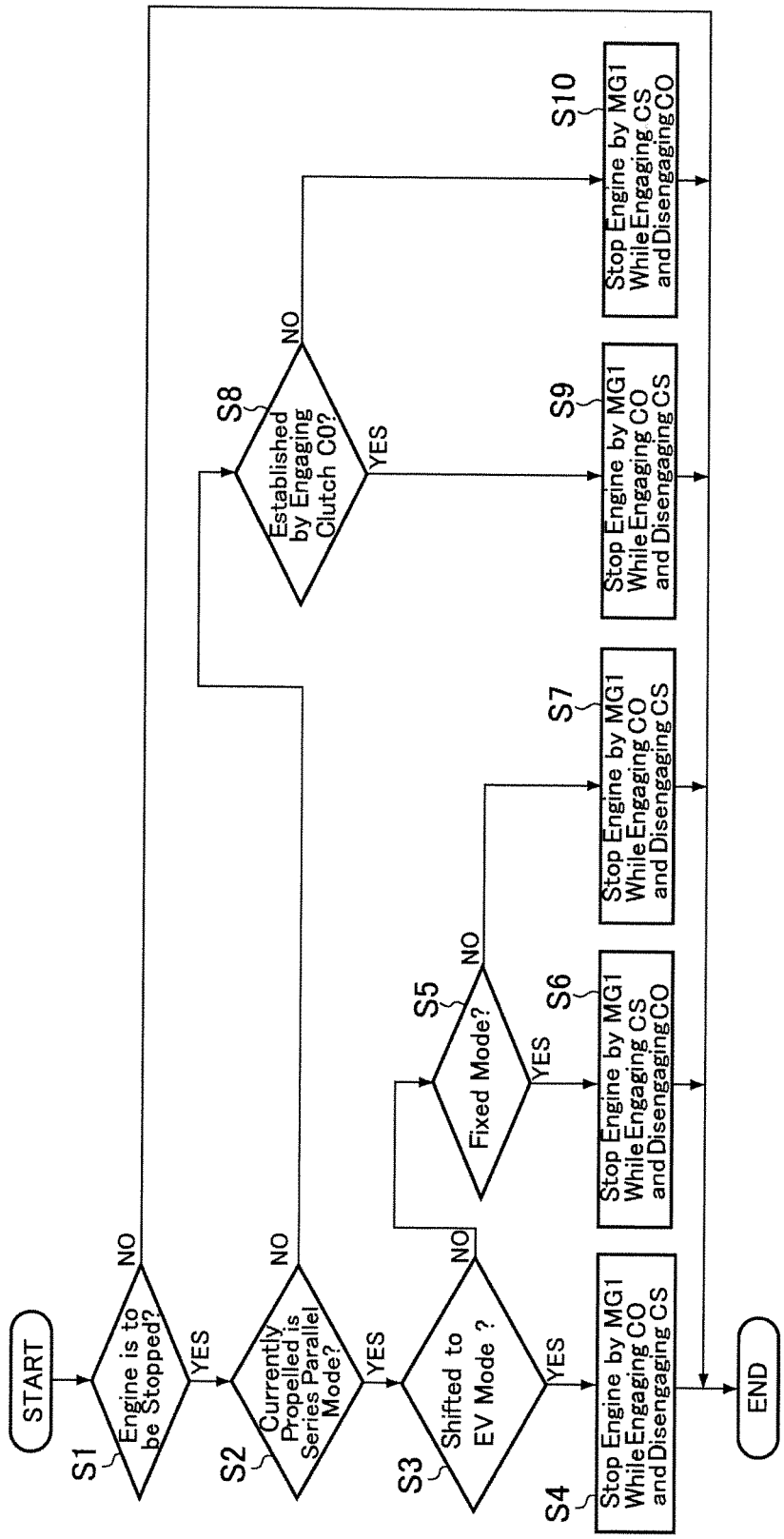
FIG. 1 is a flowchart showing one example of a routine executed by the control system according to the embodiment.

In order to thus stop the engine 1 using the first motor 4, the HV-ECU 100 executes a routine shown in FIG. 1 with reference to the above-explained maps.

First of all, the necessity of stopping the engine 1 is determined at step S1. If the engine 1 does not have to be stopped so that the answer of step S1 is NO, the routine is returned without carrying out any specific control. For example, when the operating mode is shifted from the series mode to the series parallel mode, from the single-motor mode to the dual-motor mode, or from the single-motor mode to the series mode, the routine is returned.

By contrast, if the operating mode is shifted from the HV mode to the EV mode and hence the engine 1 is required to be stopped, the routine progresses to step S2 to determine whether or not the current operating mode is the series parallel mode. For example, such determination at step S2 may be made based on a transmission of the hydraulic command PbC0 from the HV-ECU 100 to engage the input clutch C0.

According to the embodiment, the engine 1 is stopped while engaging any of the input clutch C0 and the series clutch CS to establish a required operating mode in the EV mode. To this end, if the vehicle is currently propelled in the series parallel mode so that the answer of step S2 is YES, the routine progresses to step S3 to determine whether or not the operating mode is shifted to any of the EV mode to be established by engaging the input clutch C0. At step s3, specifically, it is determined whether or not the operating mode is shifted to the dual-motor mode or the connecting mode with reference to the maps shown in FIGS. 6 and 7.

If the operating mode is shifted to any of the above-mentioned EV mode to be established by engaging the input clutch C0 so that the answer of step S3 is YES, the routine progresses to step S4 to stop the engine 4 while applying the torque of the first motor 4, and while keeping the input clutch C0 in engagement and disengaging the series clutch CS. Specifically, in a case that the vehicle is currently propelled in the variable mode, a speed of the engine 1 is reduced to zero by rotating the first motor 4 in a direction opposite to a rotational direction of the ring gear 6 while keeping the input clutch C0 in engagement and the series clutch CS in disengagement. By contrast, in a case that the vehicle is currently propelled in the fixed mode, a speed of the engine 1 is reduced to zero by rotating the first motor 4 in a direction opposite to a rotational direction of the ring gear 6 while keeping the input clutch C0 in engagement and disengaging the series clutch CS. Then, the routine is terminated.

If the operating mode is shifted to the disconnecting mode that is to be established without engaging the input clutch C0 so that the answer of step S3 is NO, the routine progresses to step S5 to determine whether or not the current operating mode is the fixed mode. If the vehicle is currently propelled in the fixed mode so that the answer of step S5 is YES, the routine progresses to step S6 to stop the engine 4 by rotating the first motor 4 in a direction opposite to a rotational direction of the ring gear 6 while disengaging the input clutch C0 and keeping the series clutch CS in engagement. Then, the routine is terminated. In this case, the series clutch CS may also be disengaged after stopping the engine 1.

If the vehicle is currently propelled in the variable mode so that the answer of step S5 is NO, the routine progresses to step S7 to stop the engine 4 by rotating the first motor 4 in a direction opposite to a rotational direction of the ring gear 6 while keeping the input clutch C0 in engagement and disengaging the series clutch CS. Then, the routine is terminated.

If the vehicle is currently propelled in the series mode so that the answer of step S2 is NO, the routine progresses to step S8 to determine whether or not the operating mode is shifted to any of the EV mode to be established by engaging the input clutch C0 as the aforementioned step S3. If the operating mode is shifted to any of the above-mentioned EV mode to be established by engaging the input clutch C0 so that the answer of step S8 is YES, the routine progresses to step S9 to stop the engine 4 by rotating the first motor 4 in a direction opposite to a rotational direction of the ring gear 6 while keeping the input clutch C0 in engagement and disengaging the series clutch CS as explained at step S4. Then, the routine is terminated.

If the operating mode is shifted to the disconnecting mode that is to be established without engaging the input clutch C0 so that the answer of step S8 is NO, the routine progresses to step S10 to stop the engine 4 by rotating the first motor 4 in a direction opposite to a rotational direction of the ring gear 6 while disengaging the input clutch C0 and keeping the series clutch CS in engagement. Then, the routine is terminated. In this case, the series clutch CS may also be disengaged after stopping the engine 1.

Figure 8:
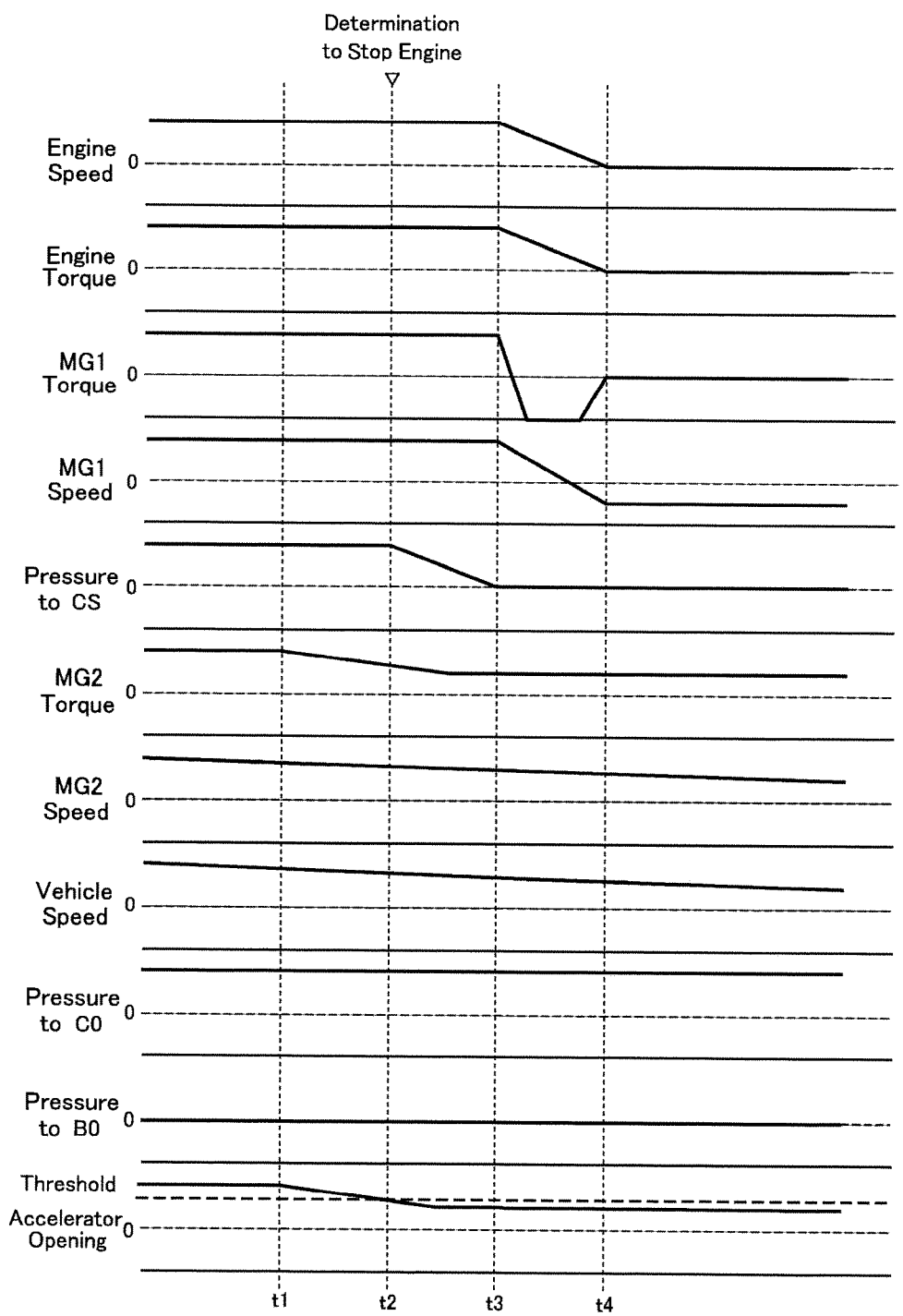
FIG. 8 is a time chart showing temporal changes in an engine speed, an engine torque, an MG1 torque, an MG1 speed, a pressure to the series clutch, an MG2 torque, an MG2 speed, a vehicle speed, a pressure to the input clutch, a pressure to the brake, and an opening degree of an accelerator, during shifting from the fixed mode to the connecting mode.
Figure 9:
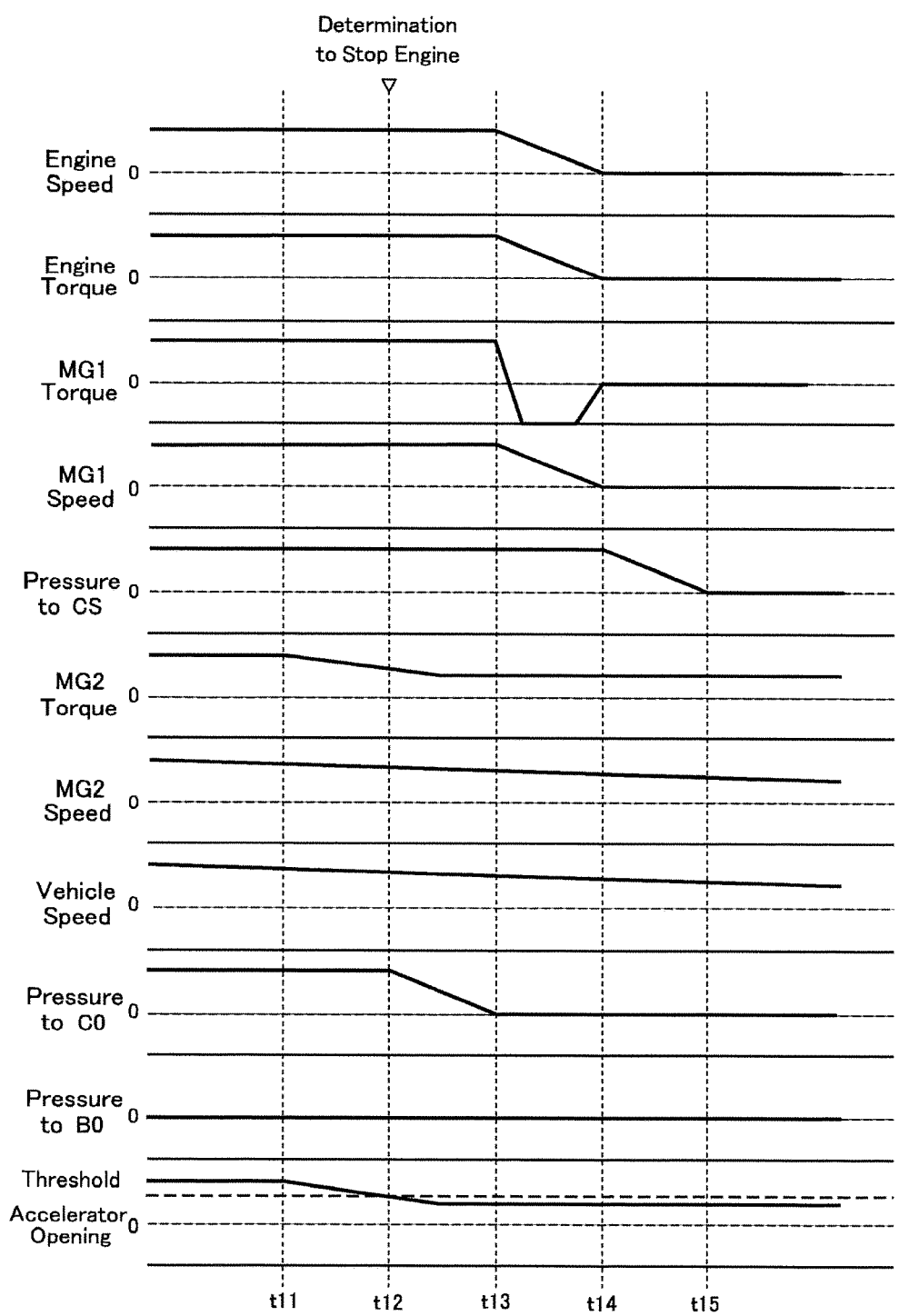
FIG. 9 is a time chart showing temporal changes in an engine speed, an engine torque, an MG1 torque, an MG1 speed, a pressure to the series clutch, an MG2 torque, an MG2 speed, a vehicle speed, a pressure to the input clutch, a pressure to the brake, and an opening degree of an accelerator, during shifting from the fixed mode to the disconnecting mode.

If the operating point is shifted from the fifth region E to the third region C in the map shown in FIG. 7 during execution of the routine shown in FIG. 1, a speed of the engine 1, a torque of the engine 1, a torque of the first motor 4 (MG1 torque), a speed of the first motor 4 (MG1 speed), a hydraulic pressure applied to the series clutch CS, a torque of the second motor 16 (MG2 torque), a speed of the second motor 16 (MG2 speed), a vehicle speed, a hydraulic pressure applied to the input clutch C0, a hydraulic pressure applied to the brake B0, and an opening degree of the accelerator are changed as indicated in FIGS. 8 and 9.

Specifically, FIG. 8 indicates changes in the above-mentioned parameters when the operating mode is shifted from the fixed mode of the series parallel mode to the connecting mode of the single-motor mode. In the example shown in FIG. 8, an opening degree of the accelerator is kept to a constant degree until point t1 so that torques of the engine 1, the first motor 4 and the second motor 16 are kept constant. In this situation, the vehicle speed is lowered gradually and hence the speed of the second motor 16 is lowered with a reduction in the vehicle speed.

When the opening degree of the accelerator starts being reduced at point t1, the torque of the second motor 16 starts being reduced with the reduction in the opening degree of the accelerator.

When the opening degree of the accelerator is reduced to be narrower than a predetermined threshold as a border of the output shaft torque between the third region C and the fifth region E in FIG. 7, a determination to stop the engine 1 is made at point t2. Consequently, a determination to shift the operating mode from the series parallel mode to the single motor mode and hence the routine shown in FIG. 1 is started.

In this situation, specifically, the determination at step S1 is made to stop the engine 1, and the determination at step S2 is made to confirm a fact that the current operating mode is the series parallel mode. In addition, the determination at step S3 is made to engage the input clutch C0 to shift the operating mode to the connecting mode.

In order to shift the operating mode to the connecting mode, the hydraulic pressure applied to the series clutch CS is reduced from the point t2. Then, when the hydraulic pressure applied to the series clutch CS is reduced to zero and hence the series clutch CS disengaged is at point t3, the torque of the first motor 4 is reversed so that the rotational speed thereof is reduced gradually, and eventually a rotational direction of the first motor 4 is reversed. In this situation, the speed of the engine 1 is reduced with such reduction in the rotational speed of the first motor 4. Consequently, the speed of the engine 1 is reduced to zero at point t4 and the vehicle starts propelling in the disconnecting mode. If the first motor 4 generates a torque to reduce the speed of the engine 1 while disengaging the input speed C0, the power distribution device 3 may output a torque in a direction to reduce the drive torque. However, such reduction in the drive torque may be prevented by increasing the output torque of the second motor 16.

FIG. 9 indicates changes in the above-mentioned parameter when the operating mode is shifted from the fixed mode of the series parallel mode to the disconnecting mode of the single-motor mode. In the example shown in FIG. 9, changes in the parameters until point t12 are similar to those until the point t2 in the example shown in FIG. 8. In this case, the routine shown in FIG. 1 progresses from step S3 to step S5 to shift the operating mode to the fixed mode. In this case, when a determination to stop the engine 1 is made at point t12, the hydraulic pressure applied to the input clutch C0 starts being reduced. Then, when the input clutch C0 is disengaged at point t13, the above-explained procedures to stop the engine 1 executed from the points t3 to t4 in the example shown in FIG. 8 are executed from point t13 to t14. Thereafter, at the point t14, the series clutch CS is disengaged according to need while keeping the input clutch C0 in engagement to establish the disconnecting mode so that the vehicle starts propelling in the disconnecting mode from point t15.

Thus, the input clutch C0 and the series clutch CS are engaged and disengaged depending on the kind of the EV mode to be established when shifting the operating mode to the EV mode and stopping the engine. According to the embodiment, therefore, the vehicle is allowed to propel in the desired EV mode after stopping the engine 1. In addition, in the case of shifting to the disconnecting mode, the series clutch CS may also be disengaged after stopping the engine 1. In this case, the operating mode is shifted to the disconnecting mode by merely disengaging the series clutch CS so that the operating mode may be shifted smoothly and promptly to the disconnecting mode. For this reason, engagement shocks of the input clutch C0 and the series clutch CS can be reduced.

Further, in the case of shifting the disconnecting mode, the torque of the first motor 4 used to stop the engine 1 will not be delivered to the drive wheels 22 by disengaging the input clutch C0 while engaging the series clutch CS. In this case, therefore, a shock resulting from stopping the engine 1 can be reduced.

Figure 10:
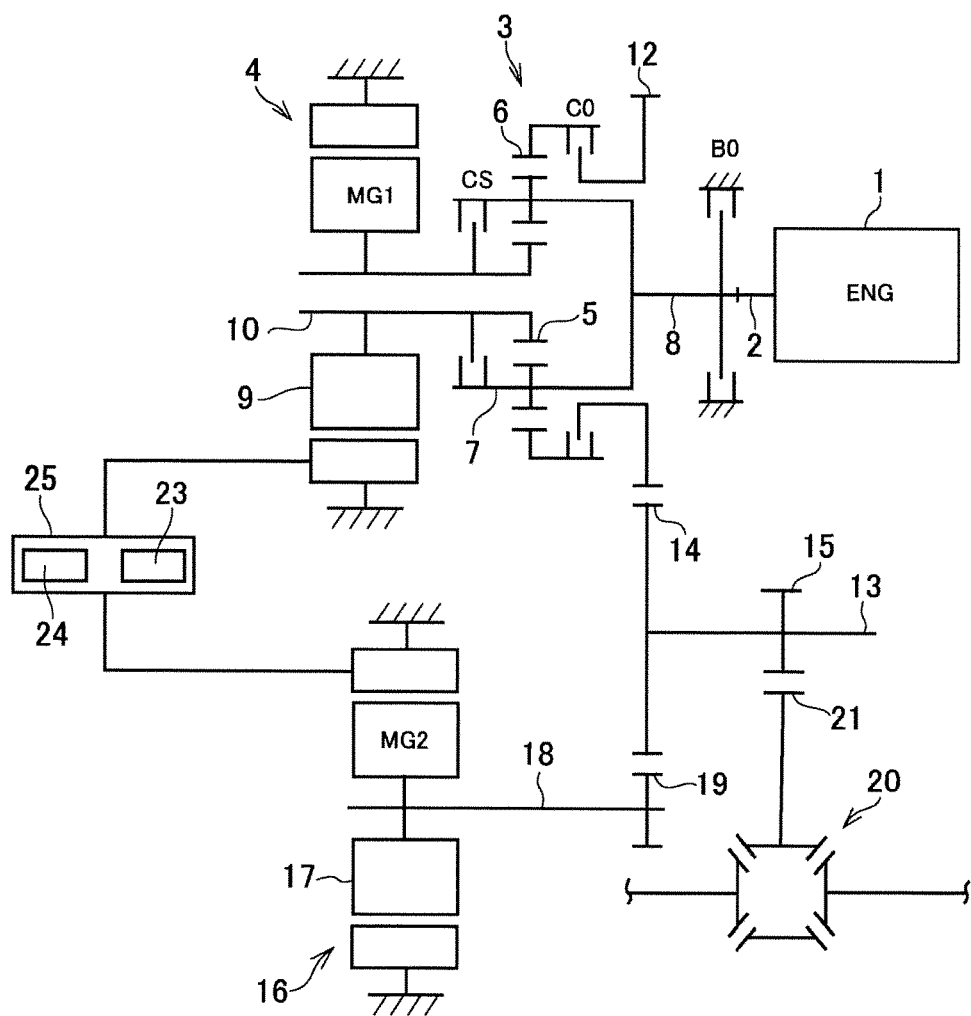
FIG. 10 is a schematic illustration showing another example of the vehicle to which the control system according to the embodiment is applied.

Turning to FIG. 10, there is shown another example of the vehicle to which the control system according to the present application is applied. In order to selectively transmit torque from the engine 1 to the output gear 12 through the power distribution device 3, the input clutch C0 may also be disposed between the ring gear 6 and the output gear 12. Likewise, in order to selectively transmit a torque from the engine 1 to the first motor 4, the series clutch CS may also be disposed between the carrier 7 and the first rotor shaft 10.

Figure 11A:
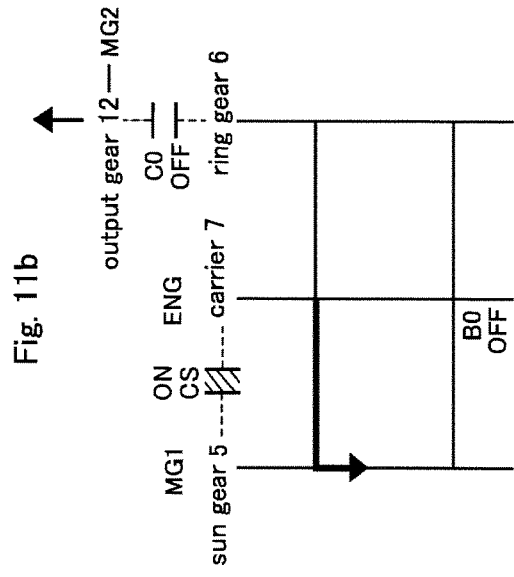
FIGS. 11a, 11b, 11c and 11d show nomographic diagrams individually indicating status of the power distribution device in each operating mode of the vehicle shown in FIG. 10.

In the vehicle according to another example, the operating mode may also be selected from the above-explained EV mode and HV mode by manipulating the input clutch C0, the series clutch CS and the brake B0. Specifically, in the EV mode in which the vehicle is powered by the second motor 16, all of the input clutch C0, the series clutch CS and the brake B0 are disengaged. Consequently, the output gear 12 is disconnected from the ring gear 6 of the power distribution device 3 so that the sun gear 5, the ring gear 6 and the carrier 7 are prevented from being rotated. In this situation, if the input clutch C0 is engaged, the ring gear 6 is rotated together with the output gear 12, and since the ring gear 7 is halted together with the engine 1, the sun gear 5 and the first motor 4 connected thereto are rotated in the counter direction. As a result, the operating mode is shifted from the disconnecting mode to the connecting mode. A status of the power distribution device 3 in the connecting mode is indicated in a nomographic diagram shown in FIG. 11a. In this situation, the carrier 7 is allowed to establish a reaction torque against an output torque of the first motor 4 by engaging the brake B0 to halt the input shaft 8 and the carrier 7. Consequently, the operating mode is shifted to the dual-motor mode in which the vehicle is powered by the first motor 4 rotated in the counter direction and the second motor 16 rotated in the forward direction.

Figure 11B:
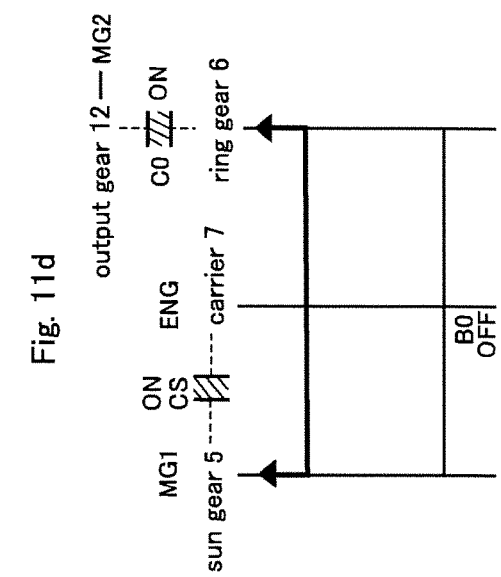

As described, in the series mode, the first motor 4 is operated as a generator by rotating the first motor 4 by the engine 1 while engaging the series clutch CS, and the second motor 16 is operated as a motor by the electric power generated by the first motor 4 to propel the vehicle. In the vehicle according to another example, the sun gear 5 is connected to the carrier 7 by the series clutch CS so that the power distribution device 3 is rotated integrally, and consequently the first motor 4 is rotated by the engine 1 to generate an electric power. In this situation, however, the input clutch C0 is in disengagement to disconnect the ring gear 6 from the output gear 12 and hence the output torque of the engine 1 will not be applied to the output gear 12. An operating state of the power distribution device 3 of the vehicle according to another example in the series mode is shown in FIG. 11b, and as shown in FIG. 11b, the sun gear 5, the ring gear 6 and the carrier 7 are rotated at a same speed.

Figure 11C:
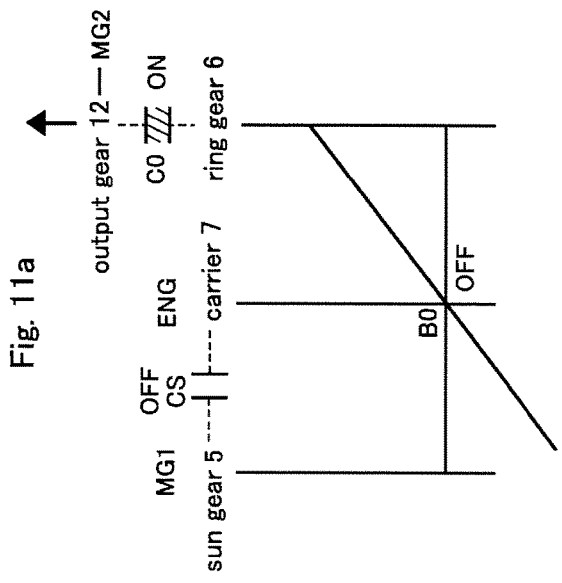

As the vehicle shown in FIG. 2, in the variable mode of the HV mode, the vehicle according to another example is propelled in the forward direction by controlling a rotational speed of the engine 1 by the first motor 4 while operating the second motor 16 by the electric power generated by the first motor 4. A status of the power distribution device 3 of the vehicle according to another example in this situation is indicated in a nomographic diagram shown in FIG. 11c. As can be seen from FIG. 11c, although positions of the input clutch C0 and the series clutch CS are altered, rotational directions of the sun gear 5, the ring gear 6 and the carrier 7 are similar to those in the nomographic diagram shown in FIG. 5c.

Figure 11D:
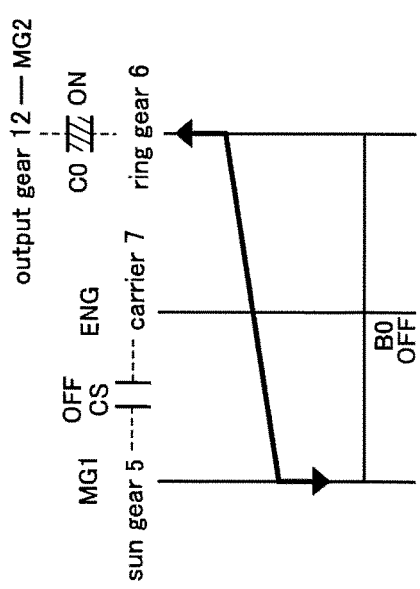

During forward propulsion in the HV mode, the fixed mode is also established in the vehicle according to another example by engaging the input clutch C0 and the series clutch CS. FIG. 11d shows an operating state of the power distribution device 3 of the vehicle according to another example in the fixed mode. In this case, since the input clutch C0 and the series clutch CS are engaged, the carrier 7 is connected to the sun gear 5 so that the power distribution device 3 is rotated integrally, and as can be seen from FIG. 11d, although positions of the input clutch C0 and the series clutch CS are altered, rotational directions of the sun gear 5, the ring gear 6 and the carrier 7 are similar to those in the nomographic diagram shown in FIG. 6c.

Although the above exemplary embodiments of the present application have been described, it will be understood by those skilled in the art that the present application should not be limited to the described exemplary embodiments, and various changes and modifications can be made within the spirit and scope of the present application. For example, a dog clutch and a one-way clutch may also be used as the clutches and the brake.

What is claimed is:

1. A drive control system for a hybrid vehicle comprising:
   an engine;
   a first motor having a generating function;
   a power distribution device that performs a differential action among an input element to which a torque of the engine is applied, a reaction element to which a torque of the first motor is applied, and an output element;
   a first clutch that is engaged to transmit the torque of the engine to drive wheels through the power distribution device;
   a second clutch that selectively provide a connection between an output shaft of the engine and the first motor;
   a second motor that generates a drive torque for propelling the vehicle;
   wherein an operating mode can be selected from: a series parallel mode in which at least the first clutch is engaged, and the vehicle is powered by the engine and the second motor; a series mode in which the first clutch is disengaged and the second clutch is engaged, the first motor is rotated by the engine to generate electric power, and the second motor is operated by the electric power generate by the first motor to propel the vehicle; and an electric vehicle mode including a first electric vehicle mode in which the vehicle is powered at least by the second motor while stopping the engine and engaging the first clutch, and a second electric vehicle mode in which the vehicle is powered by the second motor while stopping the engine and disengaging the first clutch;
   the drive control system comprising:
   a controller that manipulates the clutches and stops the engine;
   wherein the controller is configured to
   determine to shift the operating mode to the electric vehicle mode while stopping the engine,
   select the electric vehicle mode to be established from the first electric vehicle mode and the second electric vehicle mode upon satisfaction of the determination to shift the operating mode to the electric vehicle mode,
   select the clutch to be engaged when stopping the engine from the first clutch and the second clutch to establish the selected electric vehicle mode, and
   stop the engine while engaging the selected clutch.

2. The drive control system for a hybrid vehicle as claimed in claim 1, wherein the controller is further configured to stop the engine while keeping the first clutch in engagement and disengaging the second clutch in a case of shifting the operating mode from the series parallel mode or the series mode to the first electric vehicle mode.

3. The drive control system for a hybrid vehicle as claimed in claim 1,
   wherein the series parallel mode includes a first series parallel mode that is established by engaging the first clutch while disengaging the second clutch, and a second series parallel mode that is established by engaging both of the first clutch and the second clutch, and
   wherein the controller is further configured to stop the engine while disengaging the first clutch and keeping the second clutch in engagement in a case of shifting the operating mode from the second series parallel mode to the second electric vehicle mode.

4. The drive control system as claimed in claim 1,
   wherein the series parallel mode includes a first series parallel mode that is established by engaging the first clutch while disengaging the second clutch, and a second series parallel mode that is established by engaging both of the first clutch and the second clutch, and
   wherein the controller is further configured to stop the engine while keeping the first clutch in engagement and the second clutch in disengagement, in a case of shifting the operating mode from the first series parallel mode to the second electric vehicle mode.

5. The drive control system as claimed in claim 1, wherein the controller is further configured to stop the engine while keeping the first clutch in disengagement and the second clutch in engagement, in a case of shifting the operating mode from the series mode to the second electric vehicle mode.

6. The drive control system as claimed in claim 1, wherein the controller is further configured to stop the engine while applying a torque of the first motor to the engine.

* * * * *